Dec. 24, 1935.  A. WINTHER  2,025,487
TRANSMISSION CONTROL
Filed Aug. 23, 1934  4 Sheets-Sheet 1

Anthony Winther,
Inventor.
Delos G. Haynes,
Attorney.

Dec. 24, 1935.  A. WINTHER  2,025,487
TRANSMISSION CONTROL
Filed Aug. 23, 1934   4 Sheets-Sheet 2
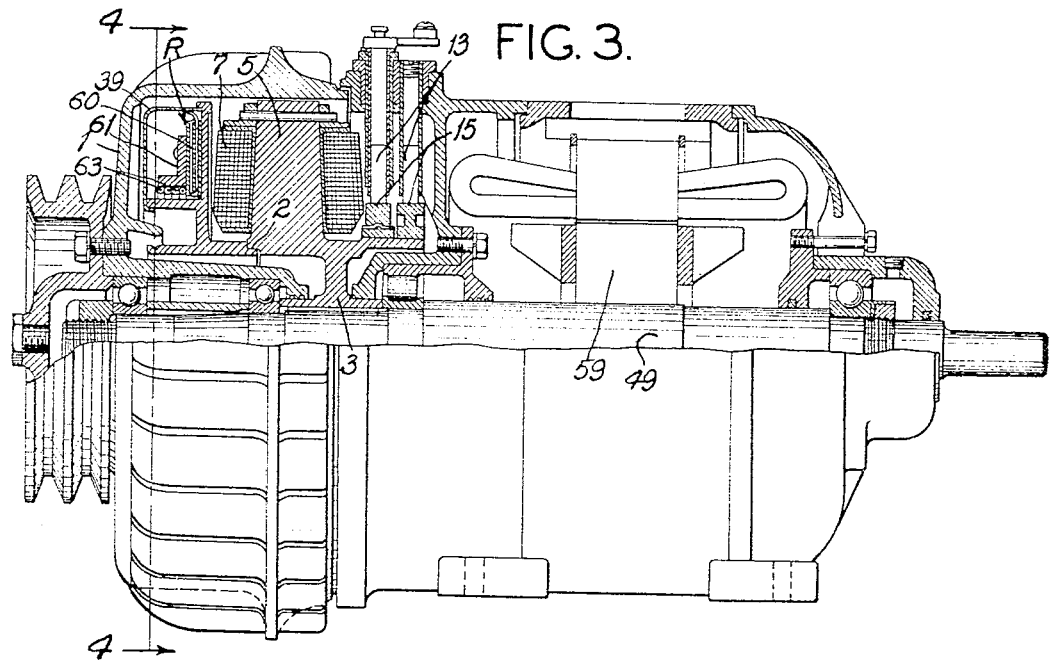
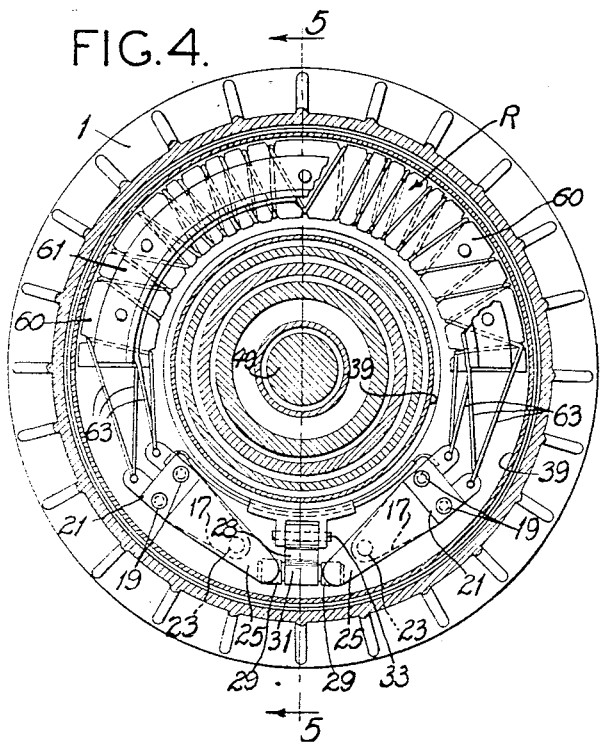
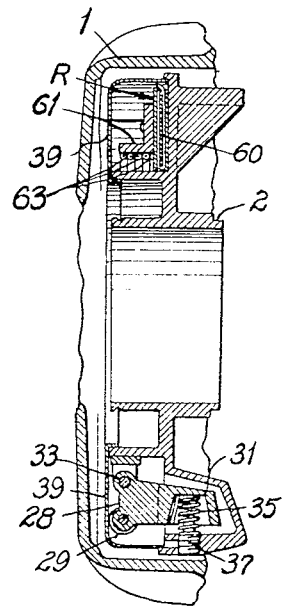
Anthony Winther,
Inventor.
Delos G. Haynes,
Attorney.

Dec. 24, 1935.   A. WINTHER   2,025,487
TRANSMISSION CONTROL
Filed Aug. 23, 1934   4 Sheets-Sheet 3
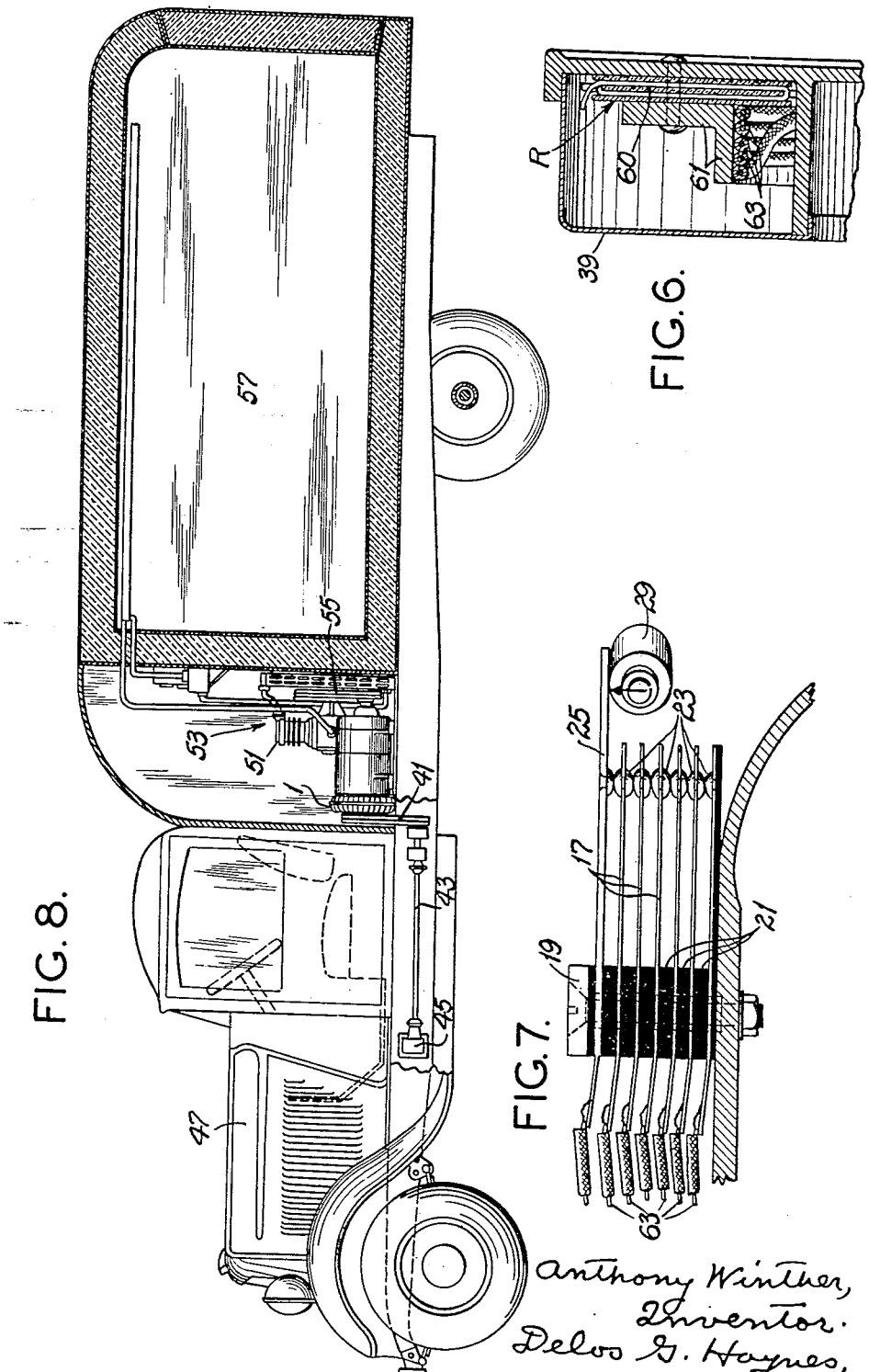

Dec. 24, 1935.  A. WINTHER  2,025,487
TRANSMISSION CONTROL
Filed Aug. 23, 1934  4 Sheets-Sheet 4

Anthony Winther,
Inventor
Delos G. Haynes,
Attorney.

Patented Dec. 24, 1935

2,025,487

UNITED STATES PATENT OFFICE 2,025,487

TRANSMISSION CONTROL

Anthony Winther, Kenosha, Wis.

Application August 23, 1934, Serial No. 741,035

16 Claims. (Cl. 172—284)

This invention relates to transmission controls, and with regard to certain more specific features, to controls of this class for power transmissions and the like.

Among the several objects of the invention may be noted the provision of an improvement upon the structure shown in my United States Patent 1,982,461, dated November 27, 1934, for Electric governor; the provision of apparatus of the class described which effects a great simplification of the governing system, and a reduction in weight, dimensions and cost of the machine as a whole, and the provision of apparatus of this class in which the wiring is simplified. Other objects will be part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which is illustrated one of various possible embodiments of the invention, Fig. 1 is a diagrammatic view of a typical form of the apparatus;

Fig. 3 is a side elevation of a commercial form of the apparatus, parts being broken away to show a section;

Fig. 4 is a vertical section taken on line 4—4 of Fig. 3;

Fig. 5 is a vertical section taken on line 5—5 of Fig. 4;

Fig. 6 is a fragmentary section of a governing unit per se;

Fig. 7 is an enlarged detail of a contact bank;

Fig. 8 is a view showing the application of the apparatus to a refrigerator truck;

Similar reference characters indicate corresponding parts throughout the several views of the drawings.

In my said Patent No. 1,982,461, I disclosed a drive consisting of an inductive driving member, associated with a driven field member, the field circuit of the latter being under control of an improved form of shunt control.

Figure 1:
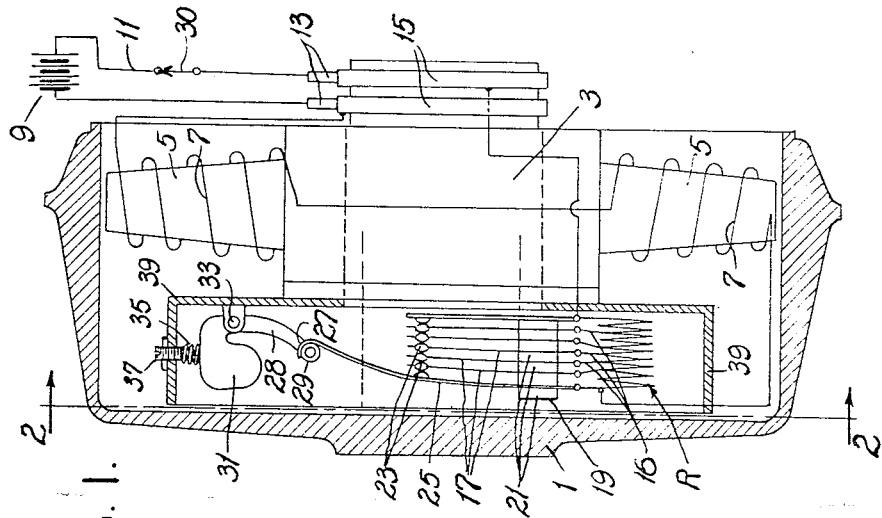

Referring now more particularly to Fig. 1 in the present application, numeral 1 indicates the driving inductive member composed preferably of homogeneous steel formed as a hollow cup over a driven steel member 3. The member 3 has poles 5 with windings 7 thereon energized by a battery 9 from a circuit 11. The circuit 11 is connected with the windings 7 through suitable brushes 13 and slip rings 15. As in said patent the circuit, including the field windings is made to include a resistance (herein indexed as R) which is shunted by a variable shunt responsive to speed of the driven member. However, the difference between this application and said Patent 1,982,461, is that in the present application the resistance and shunt are improvedly mounted to move with the driven member, instead of being stationary and mounted on separate supports, whereby the said advantages accrue.

Figure 2:
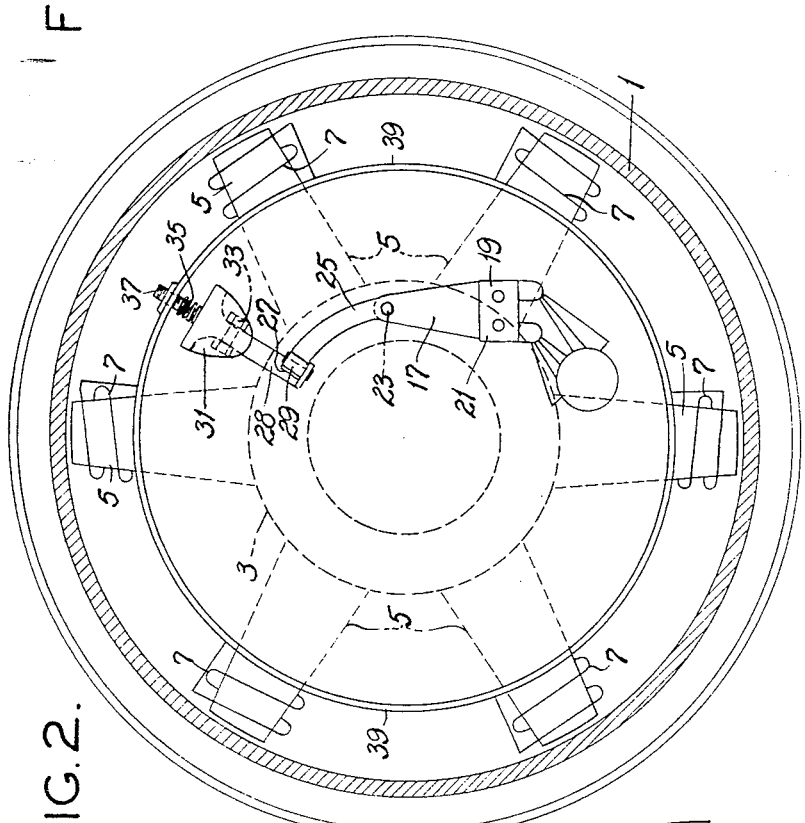
Fig. 2 is a vertical section taken on line 2—2 of Fig. 1.

As is clear from Figures 1 and 2, the resistance R is in series with the circuit 11, said circuit including the field coils 7. Taps 16 lead out from various points in the resistance R to leaf springs 17 mounted on a stud 19 and separated by insulating means 21.

The planes of the leaf springs 17 are placed substantially parallel to the plane of rotation of the driven member 3. Each carries a suitable contact point 23 normally sprung against its neighbor by the action of an end spring 25. The end spring 25 is forced to the right (Fig. 1) through the action of a coil spring 35 which presses against a weighted arm 31 pivoted at 33, thereby forcing to the right an arm 28 which carries an insulated roller 29 over which is hooked the end 27 of the spring 25.

The points 23 spring one from another in sequential order to gradually insert said resistance by movement to the left of the spring 25. Such movement is effected when the speed of rotation of the member 3 increases, thereby centrifugally throwing out the arm 31 against the reaction of spring 35, thus permitting the arm 28 to move clockwise and the spring 25 to spring to the left. Thereupon the contacts 23 open sequentially from the right hand end of their series. An adjusting screw 37 determines the regulation.

The said resistance, contact bank and centrifugal control means are all mounted within a housing 39 which is carried on and rotatable with the driven field member 3, being welded thereto. The housing 39 is entirely enclosed and hermetically sealed.

It will be clear that when the driven member 3 is stationary, the weighted arm 31 is forced inwardly by the spring 35, thus moving the end spring 25 to the right (Fig. 1) and forcing together the contacts 23 thereby shunting out all of the resistance R. (Without pressure from the spring 25, the contacts 23 would normally stand separated with the springs 17 substantially parallel.) With the contacts pressed together, thus to shunt out resistance R, battery 9 will energize the field coils 7 and cause emanation of flux from the field poles 5 and into the driving inductor 1. The result is that when the member 1 is rotated, the member 3 is inductively driven. A switch 30 permits of breaking the circuit and electro-magnetic connection. As the member 3 accelerates, the centrifugal force of member 31 acts against spring 35 and moves the arm 28 to the left, thereby opening some of the contacts 23 and gradually inserting more of the resistance R in said circuit, thereby weakening the flux and introducing increased slip between the driving member 1 and the driven member 3. Finally, a state of equilibrium is reached and thereafter any deviation from said state is compensated for by centrifugal action on said weighted arm 31 which controls the number of contacts 23 which are pressed together, and hence controls the amount of resistance R which is introduced or taken out of the circuit.

From the above, it will at once be clear that the governor mechanism is very much simplified over that shown in said prior patent.

At the same time no complication is introduced inasmuch as the spring leaves 17 are arranged so that the centrifugal force has substantially no effect upon the tension between the contacts 23, the planes of the leaves being parallel to the plane of rotation.

Furthermore, much less space is required along the shaft dimension of the machine, the control means having been placed inside of the driving armature drum.

Also, the wiring is much simplified because it is all mounted on the driven field member assembly, no outer circuits other than the supply circuit being required.

A considerable reduction in cost is effected because of the simplicity of the governor and the fact that no device is required to transmit the action of a rotating governor to a stationary rocking yoke, and then to a stationary contact bank. A large number of complicated parts are thus eliminated.

The diagrammatic form of the apparatus having been described, the description of a commercial form of the apparatus, shown in Figures 3 to 8, will now be undertaken.

In this adaptation of the invention, like numerals designate like parts. The driving member 1 is driven by a belt drive 41 from a lay shaft 43 extending from the transmission 45 of an automotive vehicle 47. The driven member 3 is keyed to a quill 49 which is connected to the compressor 51 of a refrigerating unit 53 by means of a belt drive 55. The refrigerating unit 53 is also mounted upon said vehicle 47 and is used for cooling a compartment 57.

In this form of the invention, the quill 49 also carries the armature 59 of a motor which, when the vehicle is stationary, may be energized from an external source in order to maintain the operation of the compressor 51. The integration into one compact unit of the auxiliary driving motor and the inductive drive above described, is permitted by the improved mounting of the control resistance on the driven member.

The casing 39 for holding the control parts (Fig. 5), is directly adjacent to the coils 7 (Fig. 3). This casing rotates with the driven member 3, having a force fit with respect thereto as shown at numeral 2. Instead of having only a single resistance R and a single bank of contacts 23, a double set is used, two rollers 29 contacting with two springs 25. The resistances R are wound upon a support 60 which is clamped in position by a ring 61. The wires 63 which lead from the banks of contacts 23 are led to the resistances R in the annular space inside of said member 61 (see Fig. 6). The particular method of connecting the resistances R in multiple need not be outlined here because there are various ways of doing this depending upon the regulation desired.

It will be understood that the resistance may be controlled by means rotatable with the driving member, as well as with the driven member. In this case, it would be necessary that the load on the driven shaft be constant and the values of resistances shunted out by the shunting means would have to be functions of the slip required to govern the driven member as the speed of the driving member increases.

It is also clear that the field spider 3 itself may be the driving element, the drum 1 being used as a driven member. Thus, in Fig. 1, the resistance and shunt means may be considered to be on the driving or driven element, depending upon whether the prime mover is attached to the drum 1 or the member 3.

It will be noted that in the form of the invention shown in Figures 3 to 7, that the normal tendency of spring 35 is to press together the contacts 23 and that the centrifugal action of weight 31 tends to take the load of this spring 35 from contacts 23 and thus to gradually open the contacts.

From Figures 3 and 5, it will be noted that the governing device itself is hermetically sealed. Such sealing is possible because no governor parts extend outside of the housing 39. Thus there is effected an absolute seal against dirt and oil.

Figure 9:
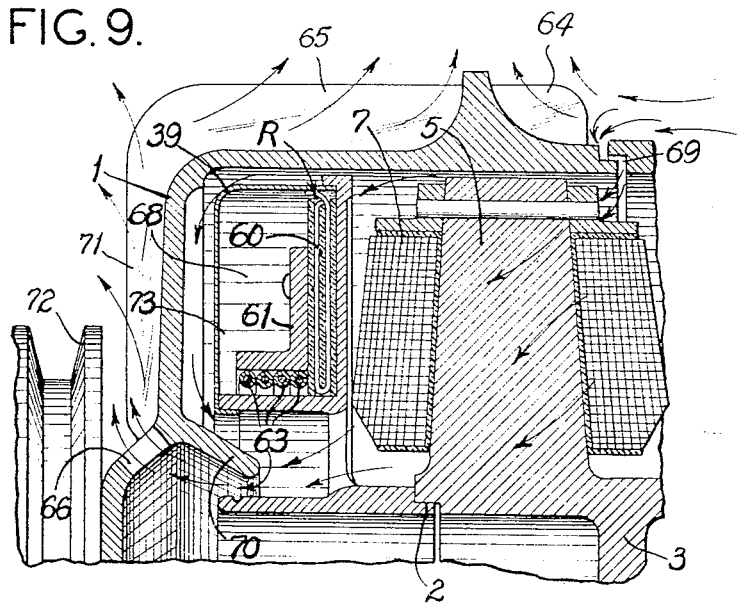
Fig. 9 is an enlarged, fragmentary section showing certain air circulating means; and, Fig. 10 is a fragmentary view of a portion of Fig. 9 but showing an alternative position of resistance.

In Fig. 9 is shown how the air circulates in a modified form. Numeral 66 indicates openings near the hub of the member 1. Cool air enters the space 69, circulates past the field coils 7, inner surface of the drum 1 and the resistance R. As it is heated, it becomes lighter and gathers near the center of the arrangement as shown. On the other hand the cool air is thrown outward, being heavier. However an angular lip 70 on drum 1 near ports 66 with the aid of fins 71 causes direction of a strong suction of air through port 66. Fins 71 throw air outward by centrifugal force so as to cause this suction. The action is aided by the limitation of flow of air due to the pulley 72, the latter preventing movement of air from all points except port 66.

Fan 64 functions as an air cleaner, the centrifugal action thereof throwing off all sizable portions of dust and dirt entering the air port 69.

Figure 10:
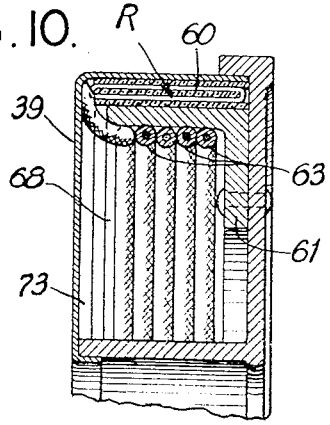

Referring again to the resistance unit R, (Fig. 9) inside housing 39, it will be seen that by placing R on one side of the housing, a circulation of air is made possible as shown by the arrows inside housing 39. This is due to the fact that the heated air from R is cooled all along surface 73 by the outer air flowing downward in the drum space. As long as R is placed anywhere except in the bottom of the housing 39, cooling circulation will take place as the tendency of the heated air is to move toward the axis of rotation. Fig. 10 shows an example of placing the resistance R on the top or outside of the housing, as differentiated from the side or bottom.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim:

1. In governing apparatus of the class described, a governor, a driving element, a driven element, electro-magnetic driving means between said elements, a circuit for energizing the electro-magnetic means, a resistance in said circuit, means for variably shunting said resistance, said last-named means being responsive to the speed of one of the elements, said resistance and shunting means being mounted to move as a unit with one of said elements.

2. In governing apparatus of the class described, a governor, a driving element, a driven element, electro-magnetic driving means between said elements, a circuit for energizing the electro-magnetic means, a resistance in said circuit, means for variably shunting said resistance, said last-named means being responsive to the speed of the driven element, said resistance and said shunting means being mounted on and movable with the driven element.

3. In governing apparatus of the class described, a governor, a driving element, a driven element, electro-magnetic driving means between said elements, a circuit for energizing the electro-magnetic means, a resistance in said circuit, means for variably shunting said resistance, said last-named means being responsive to the speed of the driven element, said speed responsive means, resistance and shunting means being mounted on and movable with the driven element.

4. Governing apparatus of the class described comprising a rotary driving element, a rotary driven element, means for effecting a magnetic drive between said elements, an electric circuit for energizing the magnetic means, a resistance in said circuit and mounted on the rotary driven element, variable shunt means associated with said resistance and also mounted on said rotary driven element, and means mounted on said driven element and responsive to the movement thereof adapted to operate said shunt means to shunt out said resistance as the speed of the said driven element is reduced and vice versa.

5. Governing apparatus of the class described comprising a rotary driving element, a rotary driven element, means for effecting a magnetic drive between said elements, an electric circuit for energizing the magnetic means, a resistance in said circuit and mounted on the rotary driven element, variable shunt means associated with said resistance and also mounted on said rotary driven element, and means mounted on said driven element and responsive to the movement thereof adapted to operate said shunt means to shunt out said resistance as the speed of the said driven element is reduced and vice versa, said shunt means comprising taps from the resistance, a plurality of leaf springs electrically connected to said taps, and contact means on the springs adapted to be moved into and out of engagement.

6. Governing apparatus of the class described comprising a rotary driving element, a rotary driven element, means for effecting a magnetic drive between said elements, an electric circuit for energizing the magnetic means, a resistance in said circuit and mounted on the rotary driven element, variable shunt means associated with said resistance and also mounted on said rotary driven element, means mounted on said driven element and responsive to the movement thereof adapted to operate said shunt means to shunt out said resistance as the speed of the said driven element is reduced and vice versa, said shunt means comprising taps from the resistance, and contact means on the springs adapted to be moved into and out of engagement, said springs having their planes substantially parallel to the plane of rotation of said driven element.

7. Governing apparatus of the class described comprising a rotary driving element, a rotary driven element, means for effecting a magnetic drive between said elements, an electric circuit for energizing the magnetic means, a resistance in said circuit and mounted on the rotary driven element, variable shunt means associated with said resistance and also mounted on said rotary driven element, means mounted on said driven element and responsive to the movement thereof adapted to operate said shunt means to shunt out said resistance as the speed of the said driven element is reduced and vice versa, said shunt means comprising taps from the resistance, contact means on the springs adapted to be moved into and out of engagement, said springs having their planes substantially parallel to the plane of rotation of said driven element, said means for moving the shunt contacts being responsive to centrifugal force engendered by rotation of said driven element.

8. A controlled drive comprising a rotating driving member, a rotating driven member, electro-magnetic means effecting a drive between said driving member and said driven member, a circuit for effecting energization of said electro-magnetic means, a resistance in said circuit and mounted to revolve with the driven member, said resistance comprising a plurality of leaf springs affixed to the driven member and electrically tapped to the resistance, means insulating the springs, contact points on the springs adapted to be serially pressed together and means mounted on the driven member and subject to centrifugal force adapted to control said contacts to more or less shunt said resistance by means of said contacts.

9. A controlled drive comprising a rotating driving member, a rotating driven member, electro-magnetic means effecting a drive between said driving member and said driven member a circuit for effecting energization of said electro-magnetic means, a resistance in said circuit and mounted to revolve with the driven member, said resistance comprising a plurality of leaf springs affixed with respect to the driven member and electrically tapped to the resistance, the planes of said springs being substantially parallel to the plane of rotation of the driven member, means insulating the springs, contact points on the springs adapted to be serially pressed together and means mounted on the driven member and subject to centrifugal force adapted to control said contacts to more or less shunt said resistance by means of said contacts.

10. A controlled drive comprising a rotating driving member, a rotating driven member, electro-magnetic means effecting a drive between said driving member and said driven member, a circuit for effecting energization of said electro-magnetic means, a resistance in said circuit and mounted to revolve with the driven member, said resistance comprising a plurality of leaf springs affixed to the driven member and electrically tapped to the resistance, means insulating the springs, contact points on the springs adapted to be serially pressed together, and means mounted on the driven member and subject to centrifugal force adapted to control said contacts to more or less shunt said resistance by means of said contacts, said resistance being mounted peripherally of the driven member and the planes of said springs substantially parallel to the plane of rotation of the driven member.

11. A controlled drive comprising a rotating driving member, a rotating driven member, electro-magnetic means effecting a drive between said driving member and said driven member, a circuit for effecting energization of said electro-magnetic means, a resistance in said circuit and mounted to revolve with the driven member, said resistance comprising a plurality of leaf springs affixed to the driven member and electrically tapped to the resistance, means insulating the springs, contact points on the springs adapted to be serially pressed together and means mounted on the driven member and subject to centrifugal force adapted to control said contacts to more or less shunt said resistance by means of said contacts, said resistance being mounted peripherally of the driven member.

12. In governing apparatus of the class described, a governor, a driving element, a driven element, electro-magnetic driving means between said elements, a circuit for energizing the electro-magnetic means, a resistance in said circuit, means for variably shunting said resistance, said last-named means being responsive to the speed of the driving element, said resistance and said shunting means being mounted on and movable with the driving element.

13. In governing apparatus of the class described, a governor, a driving element, a driven element, electro-magnetic driving means between said elements, a circuit for energizing the electro-magnetic means, a resistance in said circuit, means for variably shunting said resistance, said last-named means being responsive to the speed of one of the elements, said resistance and shunting means being mounted to move as a unit with one of said elements, and being hermetically sealed thereon.

14. In electrical apparatus, an outside rotating member, an inside rotating member, said inside rotating member carrying apparatus to be cooled, there being an outside opening associated with the outside rotating member, fins on said outside rotating member adjacent said opening adapted to throw heavier particles outwardly to effect cleaning of air drawn into said outside opening, said outside member having at least one inner opening adjacent the central portions thereof, and means exteriorly of the outside member adapted to centrifugally force air away from said inner opening, whereby the air is drawn by the rotation of said members through the outer opening in the direction of natural convection within the outside member and out through said inner opening.

15. In electrical apparatus, an outside rotating member, an inside rotating member, said inside rotating member carrying apparatus to be cooled, there being an outside opening associated with the outside rotating member, fins on said outside rotating member adjacent said opening adapted to throw heavier particles outwardly, said outside member having at least one inner opening adjacent the central portions thereof, and means exteriorly of the outside member adapted to centrifugally force air away from said inner opening, said centrifugal means comprising fins on the outside rotating member and confining means determining a passage for air adjacent to said fins.

16. In electrical apparatus, an outside rotating member, an inside rotating member, means on said inside rotating member adapted to be cooled, said outside member having at least one opening associated therewith for admitting cool air, said outside member having inner openings permitting exit of warm air, and means located on the outside of said outside member adapted to draw air through said inner opening from the inside to the outside thereof.

ANTHONY WINTHER.